(12) United States Patent
Toyoshima

(10) Patent No.: US 9,290,135 B2
(45) Date of Patent: Mar. 22, 2016

(54) IN-VEHICLE ELECTRONIC DEVICE AND DATA COLLECTION SYSTEM

(71) Applicant: Rintaro Toyoshima, Kanagawa (JP)

(72) Inventor: Rintaro Toyoshima, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 131 days.

(21) Appl. No.: 14/131,539

(22) PCT Filed: Feb. 25, 2013

(86) PCT No.: PCT/JP2013/001071
§ 371 (c)(1),
(2) Date: Jan. 8, 2014

(87) PCT Pub. No.: WO2013/128877
PCT Pub. Date: Sep. 6, 2013

(65) Prior Publication Data
US 2014/0139317 A1    May 22, 2014

(30) Foreign Application Priority Data

Mar. 2, 2012   (JP) ................................. 2012-046209

(51) Int. Cl.
| | |
|---|---|
| G05B 19/00 | (2006.01) |
| G05B 23/00 | (2006.01) |
| G06F 7/04 | (2006.01) |
| G06F 7/00 | (2006.01) |
| G06K 19/00 | (2006.01) |
| G06F 17/00 | (2006.01) |
| G01C 21/00 | (2006.01) |

(Continued)

(52) U.S. Cl.
CPC ..................... B60R 16/02 (2013.01)

(58) Field of Classification Search
CPC ........................................................ H04L 29/08
See application file for complete search history.

(56) References Cited

U.S. PATENT DOCUMENTS 6,122,580 A * 9/2000 Autermann ..................... 701/49
8,977,408 B1 * 3/2015 Cazanas ................ H04L 41/082
455/3.03

(Continued)

FOREIGN PATENT DOCUMENTS

| JP | 2008-189163 A | 8/2008 |
|---|---|---|
| JP | 2008-279024 A | 11/2008 |

(Continued)

OTHER PUBLICATIONS

International Search Report for PCT/JP2013/001071, Apr. 9, 2013.

*Primary Examiner* — Jennifer Mehmood
*Assistant Examiner* — Pameshanand Mahase
(74) *Attorney, Agent, or Firm* — RatnerPrestia

(57) ABSTRACT

The present invention relates to an in-vehicle electronic device and a data collection system including the same, and has an object to enhance the convenience. In order to achieve this object, the present invention includes: an input unit for a personal ID; an in-vehicle control unit connected to the input unit; and an in-vehicle transmission unit and an in-vehicle reception unit connected to the in-vehicle control unit. The in-vehicle control unit is connected to a memory that records therein a data collection condition set for each personal ID. If a personal ID is inputted to the input unit, data of a person associated with the personal ID can be collected from a server. With this configuration, pieces of data of a plurality of persons who are in the same automobile can be collected from the server.

8 Claims, 8 Drawing Sheets

(51) Int. Cl.
  *G05D 17/00* (2006.01)
  *B60R 16/02* (2006.01)

(56) References Cited

U.S. PATENT DOCUMENTS

2009/0098855 A1* 4/2009 Fernandez et al. ............ 455/410
2009/0325557 A1* 12/2009 Wada ......................... 455/414.4
2012/0129460 A1* 5/2012 Hodis et al. ................ 455/67.11
2012/0191476 A1* 7/2012 Reid et al. ......................... 705/3

FOREIGN PATENT DOCUMENTS

| JP | 2009-234509 A | 10/2009 |
| JP | 2009-289113 A | 12/2009 |
| JP | 2011-18127 A | 1/2011 |
| WO | WO 2008/047407 A1 | 4/2008 |

* cited by examiner

IN-VEHICLE ELECTRONIC DEVICE AND DATA COLLECTION SYSTEM

This application is a U.S. National Phase application of PCT International Application PCT/JP2013/001071.

TECHNICAL FIELD

The present invention relates to an in-vehicle electronic device and a data collection system including the same.

BACKGROUND ART

Techniques for connecting an in-vehicle electronic device to a server outside of a vehicle to thereby achieve excellent driving environments have been proposed.

Such an in-vehicle electronic device includes: specifically, an input unit for a personal ID; an in-vehicle control unit connected to the input unit; and an in-vehicle transmission unit and an in-vehicle reception unit connected to the in-vehicle control unit.

The server that is connected to such an in-vehicle electronic device via a network includes: a server transmission unit and a server reception unit that exchange data with the in-vehicle transmission unit and the in-vehicle reception unit; a server control unit connected to the server transmission unit and the server reception unit; and an authentication unit connected to the server control unit (see, for example, Patent Literature 1).

CITATION LIST

Patent Literature

[Patent Literature 1]
Japanese Patent Laid-Open No. 2009-234509

SUMMARY OF INVENTION

Technical Problem

In a data collection system including such an in-vehicle electronic device, for example, personal data of a user stored in a personal data storage unit provided in the server can be acquired inside of the vehicle through the in-vehicle electronic device, and hence the convenience is extremely higher.

Unfortunately, in systems that are currently in practical use, personal data of only a driver can be taken out. Accordingly, in the case where there is a fellow passenger, personal data other than that of the driver cannot be acquired, and hence there are many opinions that the convenience is not sufficient.

The present invention, which has been made in view of such a problem, has an object to enable an in-vehicle electronic device to acquire pieces of personal data of a plurality of persons, to thereby enhance the convenience.

Solution to Problem

In order to solve the above-mentioned problem, an in-vehicle electronic device according to the present invention includes: an input unit that acquires a personal ID; an in-vehicle control unit connected to the input unit; and an in-vehicle communication unit connected to the in-vehicle control unit. The in-vehicle control unit is connected to a memory that holds therein a data collection condition set for each personal ID, the in-vehicle control unit acquires a plurality of personal IDs through the input unit, and the in-vehicle control unit collects personal data corresponding to each of the plurality of personal IDs, on a basis of the data collection condition through the in-vehicle communication unit in a state where the in-vehicle control unit logs in to a server using each personal ID. Accordingly, the present invention achieves a desired object.

Advantageous Effects of Invention

As described above, the in-vehicle electronic device according to the present invention includes: the input unit that acquires the personal ID; the in-vehicle control unit connected to the input unit; and the in-vehicle communication unit connected to the in-vehicle control unit. The in-vehicle control unit is connected to the memory that holds therein the data collection condition set for each personal ID, the in-vehicle control unit acquires the plurality of personal IDs through the input unit, and the in-vehicle control unit collects the personal data corresponding to each of the plurality of personal IDs, on the basis of the data collection condition through the in-vehicle communication unit in the state where the in-vehicle control unit logs in to the server using each personal ID. Accordingly, the convenience of the in-vehicle electronic device according to the present invention is higher.

That is, in the in-vehicle electronic device according to the present invention, if a personal ID is inputted to the input unit, data of a person associated with the personal ID can be collected from the server. With this configuration, pieces of data of a plurality of persons who are in the same automobile can be collected from the server. Accordingly, the convenience of the in-vehicle electronic device according to the present invention is higher.

Further, the data collection condition set for each personal ID is recorded in the memory connected to the in-vehicle control unit. Accordingly, data the acquisition of which is set to be possible when a user gets in the automobile can be set to be impossible to acquire after he/she gets off, for example. Also in such a sense, the convenience of the in-vehicle electronic device according to the present invention is higher.

DESCRIPTION OF EMBODIMENT

Hereinafter, an embodiment of the present invention is described with reference to the attached drawings.

Embodiment 1

Figure 1:
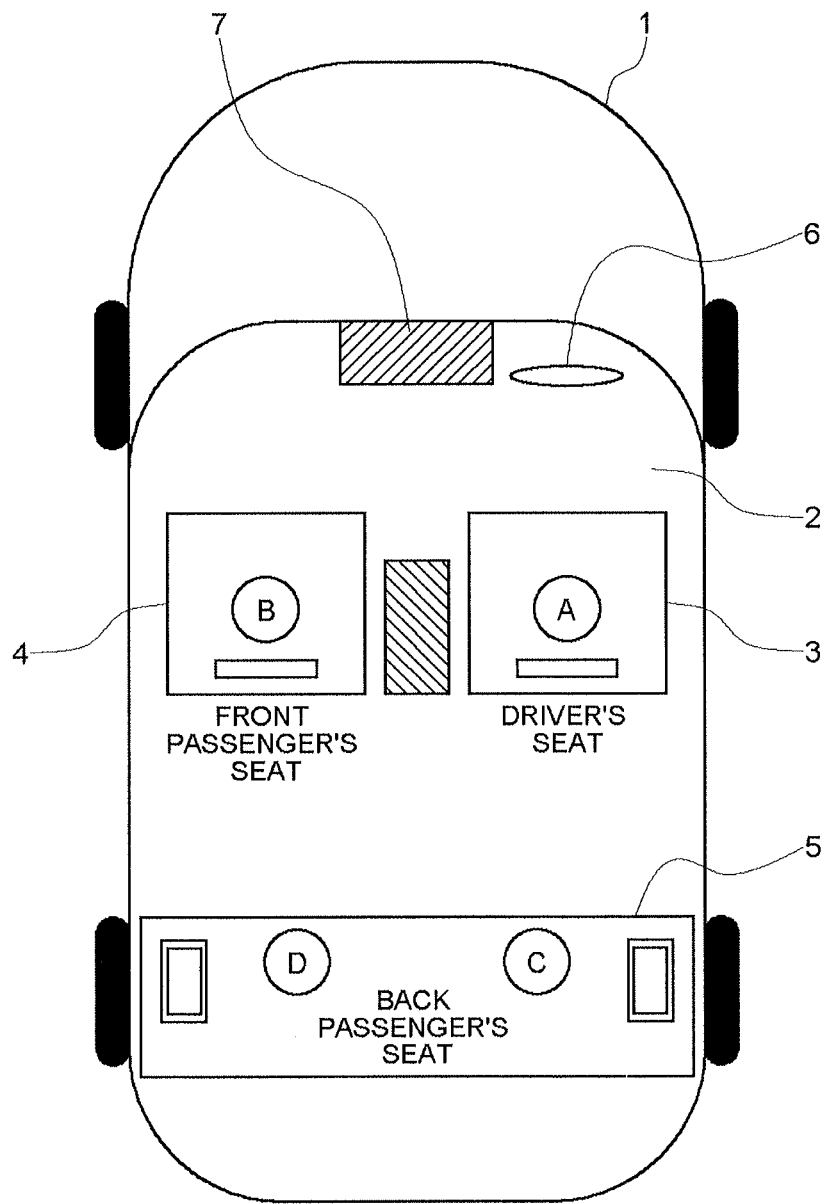
FIG. 1 is a plan view illustrating an automobile in which an in-vehicle electronic device according to an embodiment of the present invention is mounted.

FIG. 1 is a plan view illustrating an automobile in which an in-vehicle electronic device according to an embodiment of the present invention is mounted. In FIG. 1, reference sign 1 denotes the automobile, a driver's seat 3 and a front passenger's seat 4 are placed on the front side in an automobile interior 2 of the automobile 1, and a back passenger's seat 5 is placed on the back side therein.

Further, a handle 6 is placed on the front side of the driver's seat 3, and an in-vehicle electronic device 7 is placed next to the handle 6.

Figure 2:
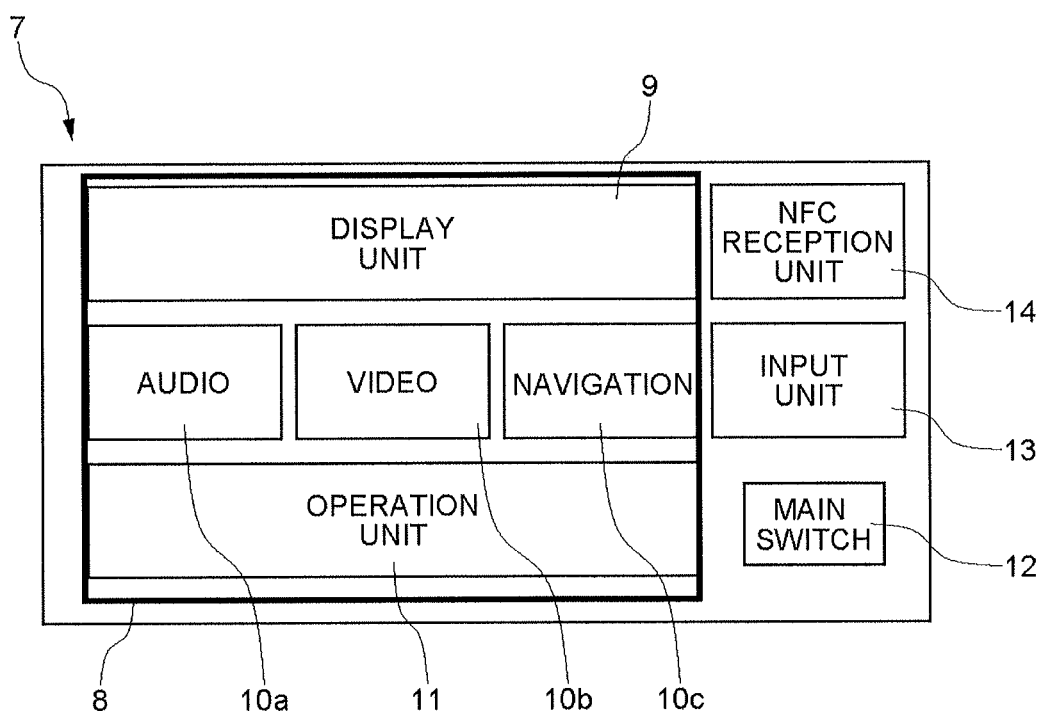
FIG. 2 is a front view of the in-vehicle electronic device.

FIG. 2 is a front view of the in-vehicle electronic device 7. As illustrated in FIG. 2, a display unit 9, an audio selection switch 10a, a video selection switch 10b, a navigation selection switch 10c, an operation unit 11, and the like are provided on a front panel 8 of the in-vehicle electronic device 7, and a main switch 12 is provided on the right side of the front panel 8. These components are generally known ones, and hence detailed description thereof is omitted.

What is characteristic of the present embodiment is that an input unit 13 for manually inputting a personal ID and a NFC reception unit 14 for inputting a personal ID using near-field radio waves are provided.

Figure 3:
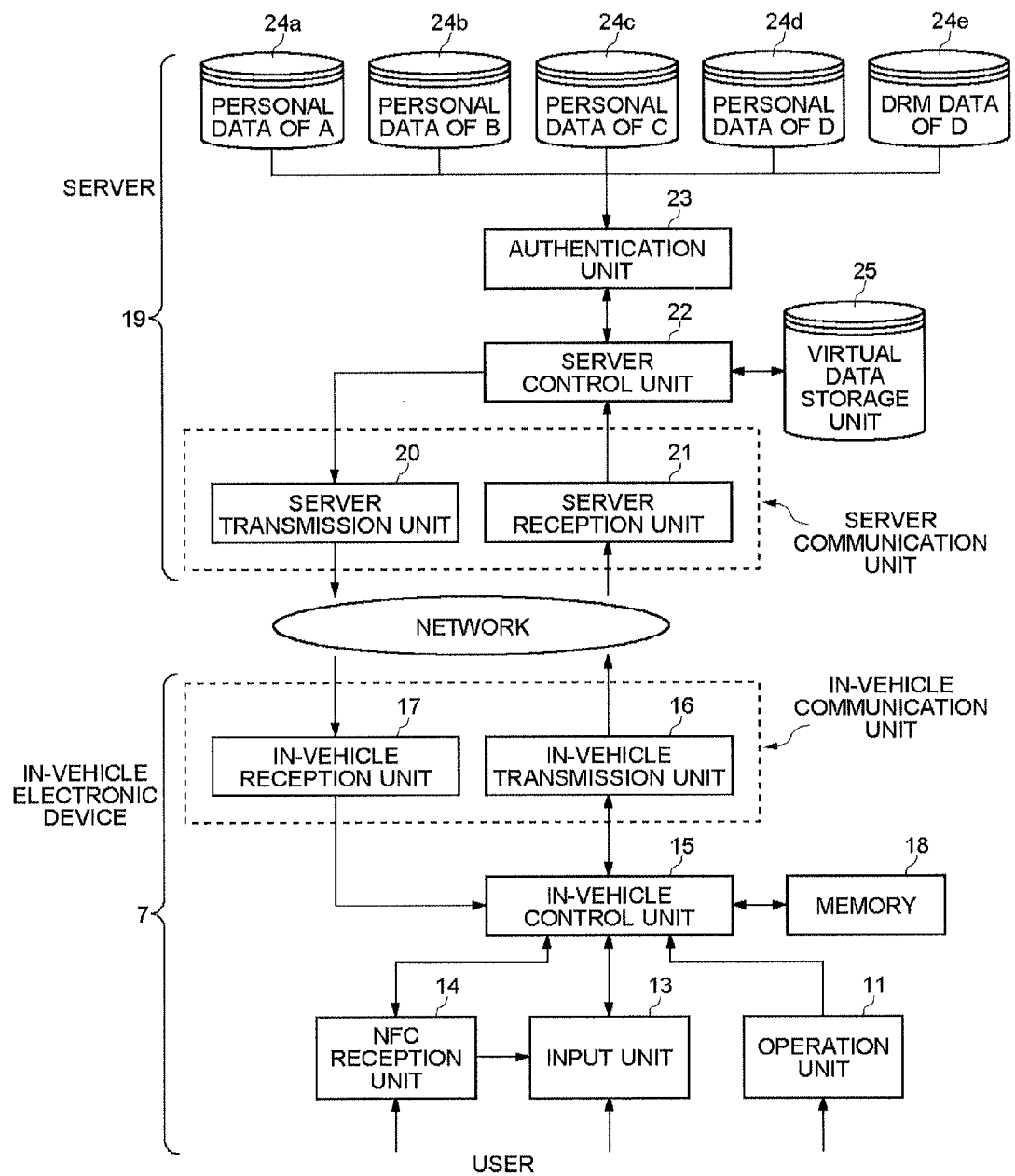
FIG. 3 is a diagram illustrating the in-vehicle electronic device and a data collection system including the same.
Figure 4:
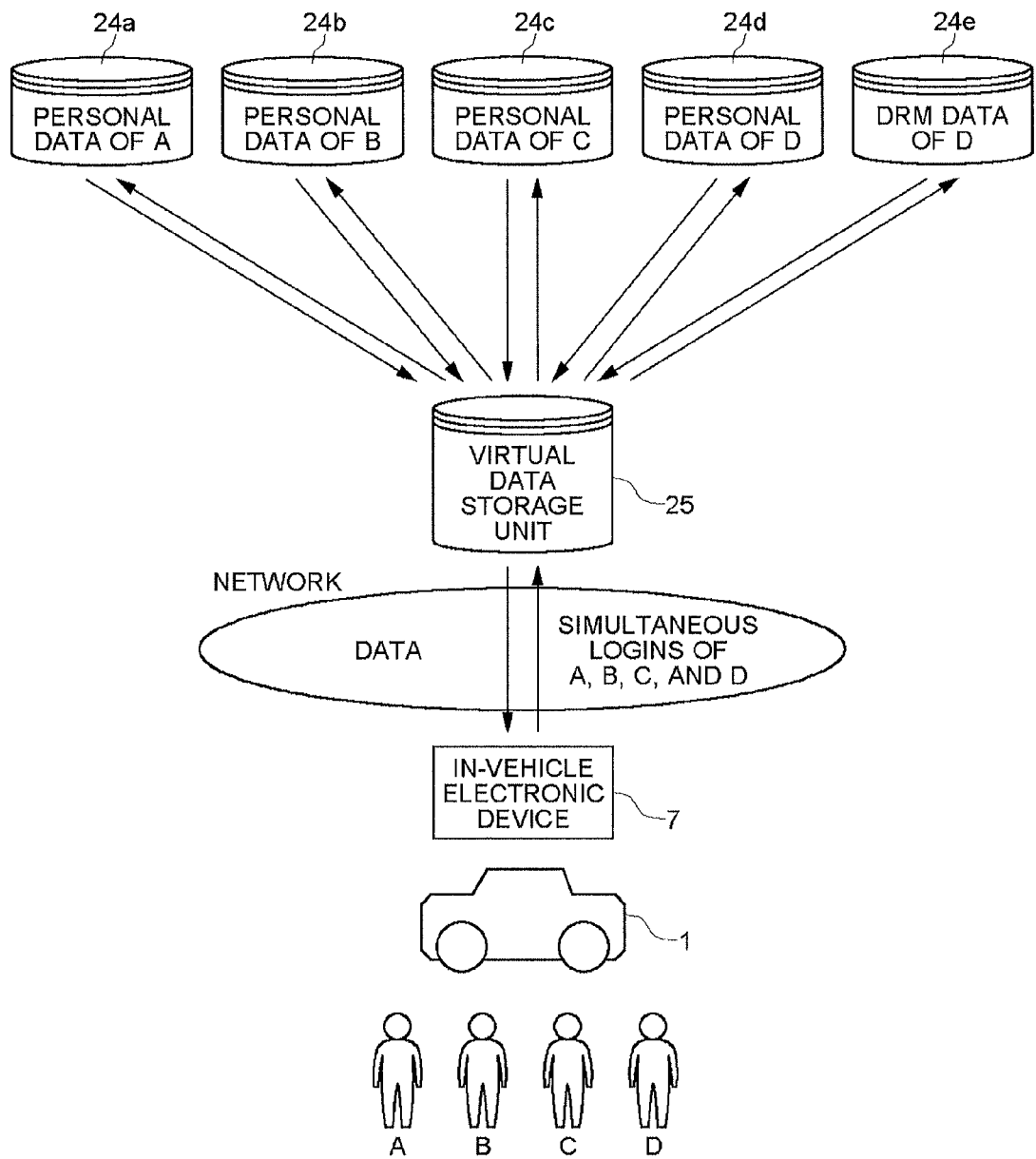
FIG. 4 is a diagram illustrating the in-vehicle electronic device and the data collection system including the same.

FIG. 3 and FIG. 4 are diagrams for describing the in-vehicle electronic device 7 and a data collection system including the same.

As illustrated in FIG. 3, the in-vehicle electronic device 7 includes: an input unit 13 for a personal ID; an in-vehicle control unit 15 connected to the input unit 13; and an in-vehicle transmission unit 16 and an in-vehicle reception unit 17 connected to the in-vehicle control unit 15. The in-vehicle transmission unit 16 and the in-vehicle reception unit 17 constitute an in-vehicle communication unit.

Further, the NFC reception unit 14 is also connected to the in-vehicle control unit 15, and a memory 18 is further connected to the in-vehicle control unit 15. A data collection condition set for each personal ID is recorded in the memory 18.

The in-vehicle electronic device 7 is connected to a server 19 via a network, and the in-vehicle electronic device 7 and the server 19 configure the data collection system as illustrated in FIG. 4.

Meanwhile, as illustrated in FIG. 3, the server 19 includes: a server transmission unit 20 and a server reception unit 21 that exchange data with the in-vehicle transmission unit 16 and the in-vehicle reception unit 17; and a server control unit 22 connected to the server transmission unit 20 and the server reception unit 21. The server transmission unit 20 and the server reception unit 21 configure a server communication unit.

Further, an authentication unit 23, personal data storage units 24a to 24e, and a virtual data storage unit 25 are connected to the server control unit 22. The virtual data storage unit 25 temporarily stores pieces of personal data of a plurality of persons for which an acquisition request is given from the input unit 13 or the NFC reception unit 14 of the in-vehicle electronic device 7.

In the above-mentioned configuration, in the present embodiment, description is given of the state where four persons A, B, C, and D including a driver are in the automobile interior 2 as illustrated in FIG. 1 and FIG. 4.

Figure 5:
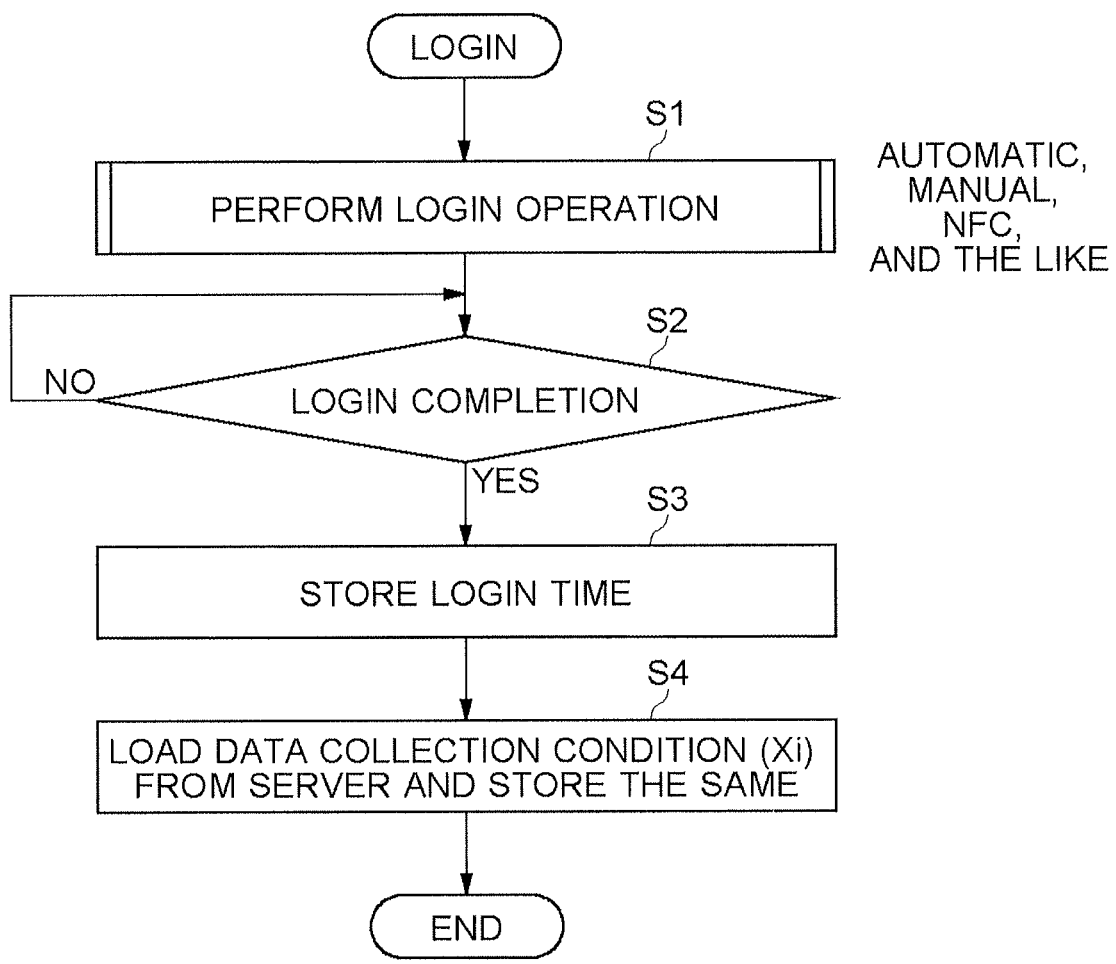
FIG. 5 is a flow chart for describing procedures from a login operation to storing of management information acquired from a server.

FIG. 5 is a flow chart for describing procedures from a login operation to storing of management information acquired from the server. Note that the procedures from S1 to S4 may be performed for each person, and the procedures in S3 and S4 may be performed at the same time for the four persons after the completion of login work for the four persons A, B, C, and D.

In the state where the four persons are in the automobile interior 2, mobile terminals (not illustrated) such as mobile phones respectively owned by the four persons are brought closer to the NFC reception unit 14 in order one by one. If one person performs a login operation (S1), the authentication unit 23 of the server 19 compares the ID of this person with personal IDs recorded in the server 19. If the ID of this person matches any of the personal IDs, the in-vehicle control unit 15 completes the login work (S2: Yes).

Logins of the other three persons are performed in the same manner.

The in-vehicle control unit 15 stores the login time of each of the four persons A, B, C, and D into the memory 18 (S3).

The server 19 transmits a data collection condition (Xi) for a personal ID as management information (personal data) set for each user (A, B, C, D) whose login has been permitted, to the in-vehicle reception unit 17 of the in-vehicle electronic device 7 through the server transmission unit 20, and the data collection condition (Xi) for a personal ID loaded from the server 19 is stored into the memory 18 (S4).

Note that, without the intermediation of the server 19, the data collection condition (Xi) for a personal ID may be inputted through the NFC reception unit 14 to be stored into the memory 18, as information stored in the mobile terminal such as the mobile phone that is owned by each person and is used for the login.

Herein, the data collection condition (Xi) for a personal ID defines, for example, that: data collection is always possible for the driver (A); data collection is always possible for the fellow passenger B within a period of time Ta from a new login; and data collection is always possible for the fellow passengers C and D within a period of time Tb after the system is turned off (for example, the engine is stopped). Specific procedures for checking the data collection condition (Xi) are described later with reference to FIG. 8.

As described above, the data collection condition (Xi) is stored into the memory 18 of the in-vehicle electronic device 7 at the time of the login of each person. Note that the data collection condition (Xi) that is once stored into the memory 18 does not need to be deleted at the time of a logout, and may be reused at the time of the next login. The data collection condition (Xi) is associated with the personal ID of each user, and hence the others cannot use the data collection condition (Xi) without his/her permission.

Then, if the four persons A, B, C, and D sequentially log in in this way, the server control unit 22 of the server 19 controls the server reception unit 21 to receive their logins, and then controls the authentication unit 23 to check the respective IDs of the persons A, B, C, and D. If the IDs are authenticated, pieces of personal data of A, B, C, and D are temporarily stored into the virtual data storage unit 25.

Note that such storing of personal data into the virtual data storage unit 25 after authentication is automatically performed in the server 19, unless the user inputs an instruction to the effect that this procedure is unnecessary, from the input unit 13 of the in-vehicle electronic device 7.

The pieces of personal data of A, B, C, and D that are temporarily stored into the virtual data storage unit 25 in this way become available in the automobile interior 2, if the user (A, B, C, D) gives a loading instruction from the operation unit 11 of the in-vehicle electronic device 7.

Specifically, if the user (A, B, C, D) inputs an instruction to load personal data from the operation unit 11 of the in-vehicle electronic device 7, the personal data stored in the virtual data storage unit 25 of the server 19 is sent to the in-vehicle reception unit 17 of the in-vehicle electronic device 7 through the server transmission unit 20, on the basis of the data collection condition (Xi) that is stored in the memory 18 in association with each personal ID. As a result, each user (A, B, C, D) can load for utilization, from the server 19, personal data desired to be used while staying in the automobile interior 2, and hence the convenience is extremely higher.

Figure 6:
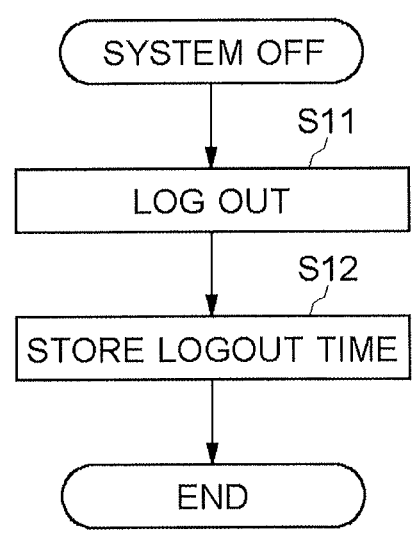
FIG. 6 is a flow chart for describing procedures for storing logout time when the system is turned off.

FIG. 6 is a flow chart for describing procedures for storing logout time when the system is turned off. For example, it is assumed that, in the course of driving the automobile 1 to a destination, the automobile 1 is stopped for a temporary rest or the like, and the engine is turned off for a while. In this case, the system is logged out (S11). The in-vehicle control unit 15 records the time of this logout into the memory 18 (S12).

Figure 7:
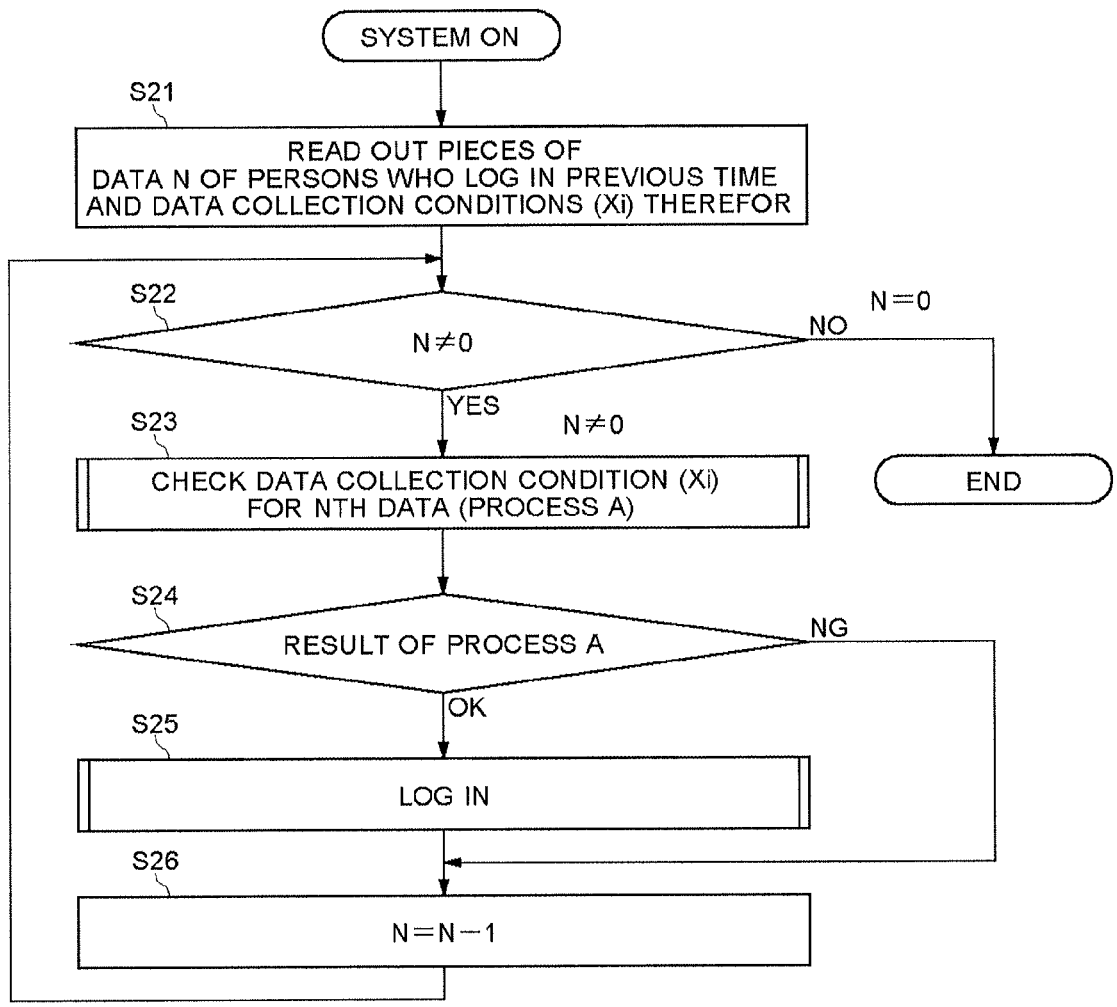
FIG. 7 is a flow chart for describing procedures when the system is restarted.

FIG. 7 is a flow chart for describing procedures when the system is restarted. If the engine is started (the system is turned on) again in order to head for the destination after the rest, the in-vehicle control unit 15 of the in-vehicle electronic device 7 reads out the number of persons who log in the previous time and the data collection conditions (Xi) therefor (S21).

In this case, because the number of persons (N=4) is not 0 (S22: Yes), the data collection conditions (Xi) for A, B, C, and D are checked (S23).

Figure 8:
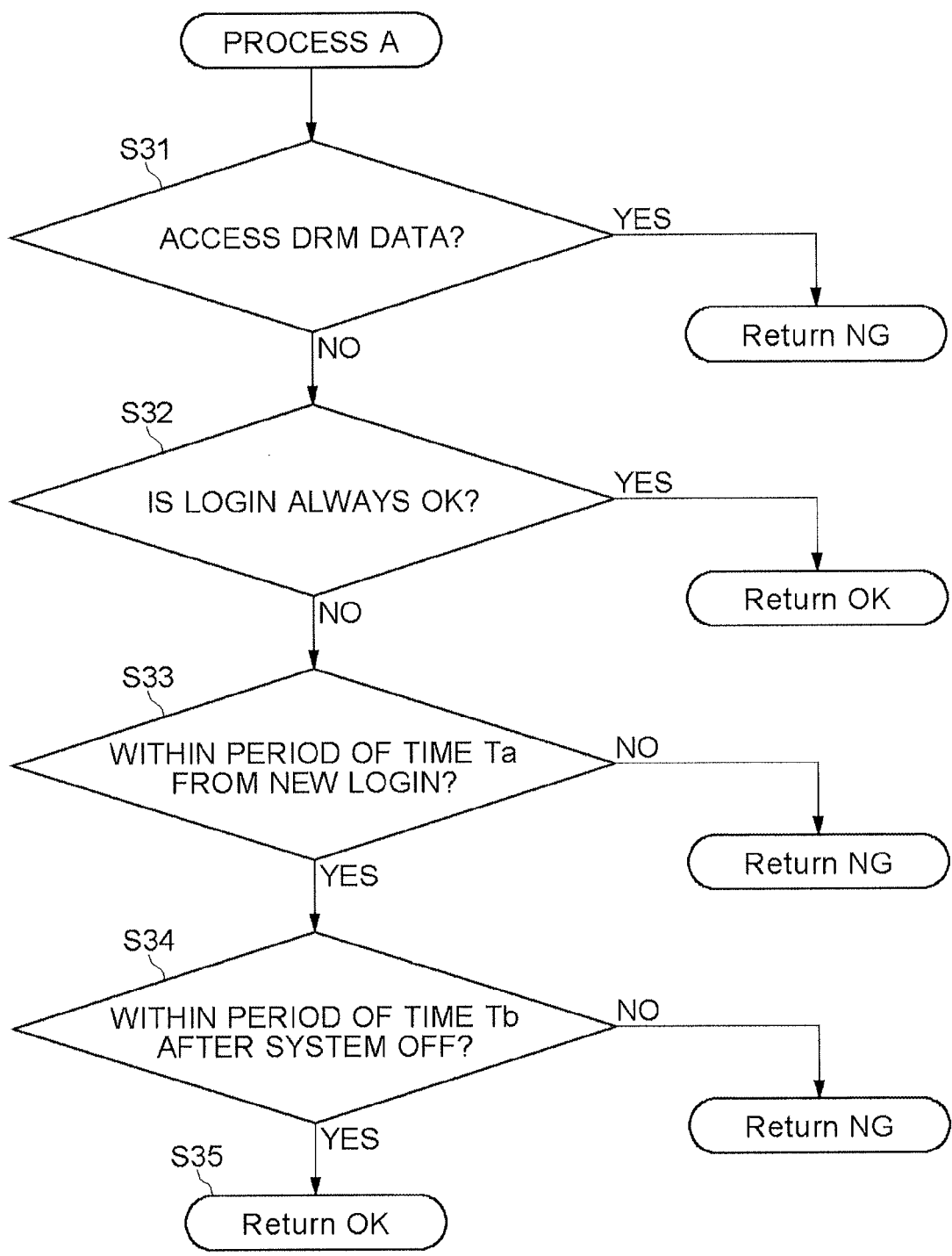
FIG. 8 is a flow chart for describing procedures for checking a data collection condition.

FIG. 8 is a flow chart for describing procedures for checking the data collection condition (Xi). In this example, data collection is always possible for A who is the driver, data collection is always possible for the fellow passenger B within the period of time Ta from a new login, and data collection is always possible for the fellow passengers C and D within the period of time Tb after the system is turned off (in this example, the engine is stopped).

Under the circumstances, the in-vehicle control unit 15 first determines whether or not to access digital rights management (DRM) data (S31). If Yes, the in-vehicle control unit 15 ends the procedures. In this example, the determination in Step S31 is No, and hence the in-vehicle control unit 15 searches for a target for which login is always possible (S32) to find the driver (A). Note that, as illustrated in FIG. 4, the fellow passenger (D) holds personal data 24*d* of D and DRM data 24*e* of D. In this case, if the personal data 24*d* of D is available without logging in again, the convenience is higher. In this case, without the procedure in Step S31, if the user inputs an instruction to load the DRM data 24*e* from the operation unit 11 of the in-vehicle electronic device 7, the login process in FIG. 5 is performed again.

Next, the in-vehicle control unit 15 searches for a target within the period of time Ta from the new login (S33) to find the fellow passenger (B).

After that, the in-vehicle control unit 15 searches for a target within the period of time Tb after the system is turned off (in this example, the engine is stopped) (S34) to find the fellow passengers (C) and (D).

If the procedures for checking the number of persons who log in the previous time and the data collection conditions (Xi) therefor are completed in this way (S24: OK), the in-vehicle control unit 15 goes to a login procedure (S25) (S35).

The above-mentioned procedures are repeated until N=0, while the N value is decremented by 1 in Step S26. That is, the above-mentioned procedures are performed until a login is completed for every user. Note that the login procedure has already been described above with reference to FIG. 5.

In this way, even after the system is restarted, each user can load for utilization personal data from the server 19 while staying in the automobile interior 2. Further, even if the number of persons or target persons change between before and after the system restart (for example, a change from the users (A, B, C, and D) to the users (A, B, and C)), a proper access to DRM data is required. Even in such a case, because the login procedure is performed again after the system restart, a proper access to DRM data is achieved.

As a matter of course, the data collection condition (Xi) can also be set such that, for example, personal data acquisition for a user who once gets off the automobile is impossible after he/she gets off. The data collection condition (Xi) can be freely set for each user, whereby the convenience is further higher.

INDUSTRIAL APPLICABILITY

As described above, according to the present invention, if a personal ID is inputted to the input unit, personal data associated with the ID can be collected from the server. Accordingly, pieces of personal data of a plurality of persons can be collected, and the convenience as the data collection system is higher.

Further, the data collection condition set for each personal ID can be recorded in the memory connected to the in-vehicle control unit. Accordingly, data the acquisition of which is set to be possible when a user gets in the automobile can be set to be impossible to acquire after he/she gets off, for example. That is, the data collection condition can be freely set for each user, whereby the convenience is further higher.

REFERENCE SIGNS LIST

1 automobile
2 automobile interior
3 driver's seat
4 front passenger's seat
5 back passenger's seat
6 handle
7 in-vehicle electronic device
8 front panel
9 display unit
10*a* audio selection switch
10*b* video selection switch
10*c* navigation selection switch
11 operation unit
12 main switch
13 input unit
14 NFC reception unit
15 in-vehicle control unit
16 in-vehicle transmission unit
17 in-vehicle reception unit
18 memory
19 server
20 server transmission unit
21 server reception unit
22 server control unit
23 authentication unit
24*a* to 24*e* personal data storage unit
25 virtual data storage unit

The invention claimed is:

1. A data collection system comprising:
a server; and
an in-vehicle electronic device communicatable with the server, wherein
the in-vehicle electronic device includes:
an input unit that acquires a personal ID;
an in-vehicle control unit connected to the input unit; and
an in-vehicle communication unit including an in-vehicle transmission unit and an in-vehicle reception unit, the in-vehicle communication unit being connected to the in-vehicle control unit,
the in-vehicle control unit is connected to a memory that holds therein a data collection condition set for each personal ID, the in-vehicle control unit acquires a plurality of personal IDs through the input unit, the in-vehicle control unit collects personal data corresponding to each of the plurality of personal IDs, on a basis of the data collection condition through the in-vehicle communication unit in a state where the in-vehicle control unit logs in to a server using each personal ID, the server includes:

a server communication unit including a server transmission unit and a server reception unit, the server communication unit communicating with the in-vehicle control unit;

a server control unit connected to the server communication unit;

an authentication unit connected to the server control unit; and a personal data storage unit that stores therein the personal data, and the server control unit is connected to a virtual data storage unit that temporarily stores pieces of personal data of a plurality of persons inputted from the input unit of the in-vehicle electronic device.

2. The in-vehicle electronic device used in a data collection system according to claim 1, comprising a NFC reception unit as the input unit.

3. The in-vehicle electronic device according to claim 2, acquiring the data collection condition through the NFC reception unit.

4. The in-vehicle electronic device used in a data collection system according to claim 1, wherein the in-vehicle control unit acquires the data collection condition from the personal data stored in the server.

5. The in-vehicle electronic device used in a data collection system according to claim 1, wherein the in-vehicle control unit is connected to an operation unit, and the personal data is collected on a basis of a user's instruction inputted from the operation unit.

6. The in-vehicle electronic device used in a data collection system according to claim 1, wherein the in-vehicle control unit causes the memory to hold therein at least one of login time and logoff time of the personal ID.

7. A data collection method for causing the in-vehicle control unit included in the in-vehicle electronic device used in a data collection system according to claim 1 to execute the following steps:

acquiring a plurality of personal IDs through the input unit;

logging in to a server for each of the plurality of personal IDs;

acquiring a data collection condition set for each personal ID; and collecting personal data corresponding to each of the plurality of personal IDs on a basis of the acquired data collection condition.

8. A recording medium recording therein the program according to claim 7.

* * * * *